US011909910B2

(12) United States Patent
Anderson et al.

(10) Patent No.: US 11,909,910 B2
(45) Date of Patent: *Feb. 20, 2024

(54) ROUTING AN INBOUND CALL TO A VIRTUAL MEETING

(71) Applicant: Zoom Video Communications, Inc., San Jose, CA (US)

(72) Inventors: Walter F. C. Anderson, Santa Cruz, CA (US); Brendan James Ittelson, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,789

(22) Filed: Jan. 11, 2023

(65) Prior Publication Data

US 2023/0164264 A1 May 25, 2023

Related U.S. Application Data

(63) Continuation of application No. 17/559,667, filed on Dec. 22, 2021, now Pat. No. 11,563,847, which is a continuation of application No. 17/163,272, filed on Jan. 29, 2021, now Pat. No. 11,245,790.

(51) Int. Cl.
*H04M 3/42* (2006.01)
*H04M 3/56* (2006.01)
*H04N 7/15* (2006.01)

(52) U.S. Cl.
CPC ......... *H04M 3/42314* (2013.01); *H04M 3/56* (2013.01); *H04N 7/15* (2013.01)

(58) Field of Classification Search
CPC ....... H04M 3/42314; H04M 3/56; H04N 7/15
USPC ............................................ 379/202.01, 158
See application file for complete search history.

(56) References Cited

U.S. PATENT DOCUMENTS

| | | |
|---|---|---|
| 7,394,896 B2 | 7/2008 | Norton |
| 7,804,949 B2 | 9/2010 | Wengrovitz |
| 7,885,395 B2 | 2/2011 | Cadiz et al. |
| 8,213,587 B2 | 7/2012 | Vendrow |
| 8,411,842 B1 | 4/2013 | Wu et al. |
| 8,804,697 B1 | 8/2014 | Capper et al. |
| 9,049,287 B2 | 6/2015 | Masters |

(Continued)

OTHER PUBLICATIONS https://www.vonage.com/unified_communications/features/, Unified Communications (UCaaS) features, 3 pages, 2020.

(Continued)

*Primary Examiner* — William J Deane, Jr.
(74) *Attorney, Agent, or Firm* — Young Basile Hanlon & MacFarlane, P.C.

(57) ABSTRACT

Voice and video features of a software platform are integrated to enable customization of software services of the software platform on a customer-basis. Routing rules are defined to route calls to certain phone numbers or extensions to certain software services. Thereafter, when a call is received via a telephony system associated with the software platform, a routing rule customized for the software platform is identified based on information signaled with the call, such as a phone number or extension dialed to place the call. A software service is determined based on the routing rule, and the phone is connected with the software system that provides the software service.

20 Claims, 7 Drawing Sheets

(56) References Cited

U.S. PATENT DOCUMENTS

| | | |
|---|---|---|
| 10,075,584 B2 | 9/2018 | Chandra |
| 10,362,121 B1 | 7/2019 | Crausaz |
| 10,462,238 B1 | 10/2019 | Naganathan et al. |
| 10,572,859 B1 | 2/2020 | Evans et al. |
| 10,581,829 B1 * | 3/2020 | Don ............ H04L 65/403 |
| 10,848,617 B1 | 11/2020 | Liu |
| 10,873,668 B1 | 12/2020 | Evans et al. |
| 11,080,096 B1 | 8/2021 | Fakhouri et al. |
| 11,172,163 B1 | 11/2021 | Chau et al. |
| 11,245,790 B1 | 2/2022 | Anderson et al. |
| 11,611,598 B2 | 3/2023 | Anderson et al. |
| 2005/0195802 A1 | 9/2005 | Klein et al. |
| 2006/0072728 A1 | 4/2006 | Cope et al. |
| 2007/0189481 A1 | 8/2007 | Cadiz et al. |
| 2008/0043976 A1 * | 2/2008 | Maximo ............ H04Q 3/66 379/220.01 |
| 2008/0112336 A1 | 5/2008 | Gray et al. |
| 2011/0072141 A1 | 3/2011 | Veenstra et al. |
| 2011/0295957 A1 | 12/2011 | Ananthanarayanan et al. |
| 2012/0200518 A1 | 8/2012 | Bear et al. |
| 2014/0045540 A1 | 2/2014 | Chau et al. |
| 2015/0016596 A1 | 1/2015 | Bellstedt et al. |
| 2015/0281442 A1 | 10/2015 | Van Rensburg et al. |
| 2016/0119436 A1 | 4/2016 | Karlsson et al. |
| 2020/0153448 A1 | 5/2020 | Wang et al. |

OTHER PUBLICATIONS https://docs.microsoft.com/en-us/microsoftteams/audio-conferencing-on-network, Open Preview of On-network Conferencing for Audio Conferencing, 2 pages, Nov. 13, 2020.

https://docs.microsoft.com/en-us/microsoftteams/how-can-caller-id-be-used-in-your-organization, How can caller ID be used in your organization, 2 pages, Aug. 26, 2020.

https://downloads.avaya.com/css/P8/documents/100109312, Call Routing Server User Guide, Avaya Release 5.0, Contact Center Express, 37 pages, 2010.

International Search Report and Written Opinion in corresponding PCT Application No. PCT/US2022/014292, dated May 12, 2022, 30 pages.

Pexip documentation: "Placing calls via the Pexip Infinity Distributed Gateway", Oct. 23, 2020(Oct. 23, 2020) I XP002806348, Retrieved from the Internet: URL:https://web.archive.org/web/20201023025957/https://docs.pexip.com/admin/about_gatewa-ys.htm [retrieved on Apr. 29, 2022] chapter : Placing calls via the Pexip Infinity Distributed Gateway chapter: How it works.

* cited by examiner

ROUTING AN INBOUND CALL TO A VIRTUAL MEETING

CROSS-REFERENCE TO RELATED APPLICATION(S)

This disclosure is a continuation of U.S. application Ser. No. 17/559,667, filed Dec. 22, 2021, which is a continuation of U.S. application Ser. No. 17/163,272, filed on Jan. 29, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for inbound call routing in an integrated voice and video platform.

One aspect of this disclosure is a system, which includes a data store, a first server, and a second server. The data store stores routing rules customized for a software platform. The first server includes a routing engine and a private branch exchange, in which the routing engine routes a call from a phone to a software service of the software platform via the private branch exchange according to a routing rule of the routing rules. The second server provides the software service.

Another aspect of this disclosure is a method, which includes receiving a call from a phone via a telephony system associated with a software platform. A routing rule customized for the software platform is identified based on information signaled with the call. A software service of the software platform is determined based on the routing rule. The phone is then connected with a software system that provides the software service.

Yet another aspect of this disclosure is a system, which includes a telephony server and a meeting server. The telephony server routes a call received from a phone registered with a software platform to a virtual meeting according to a routing rule customized for a customer of the software platform. The meeting server runs virtual meeting software to implement the virtual meeting.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
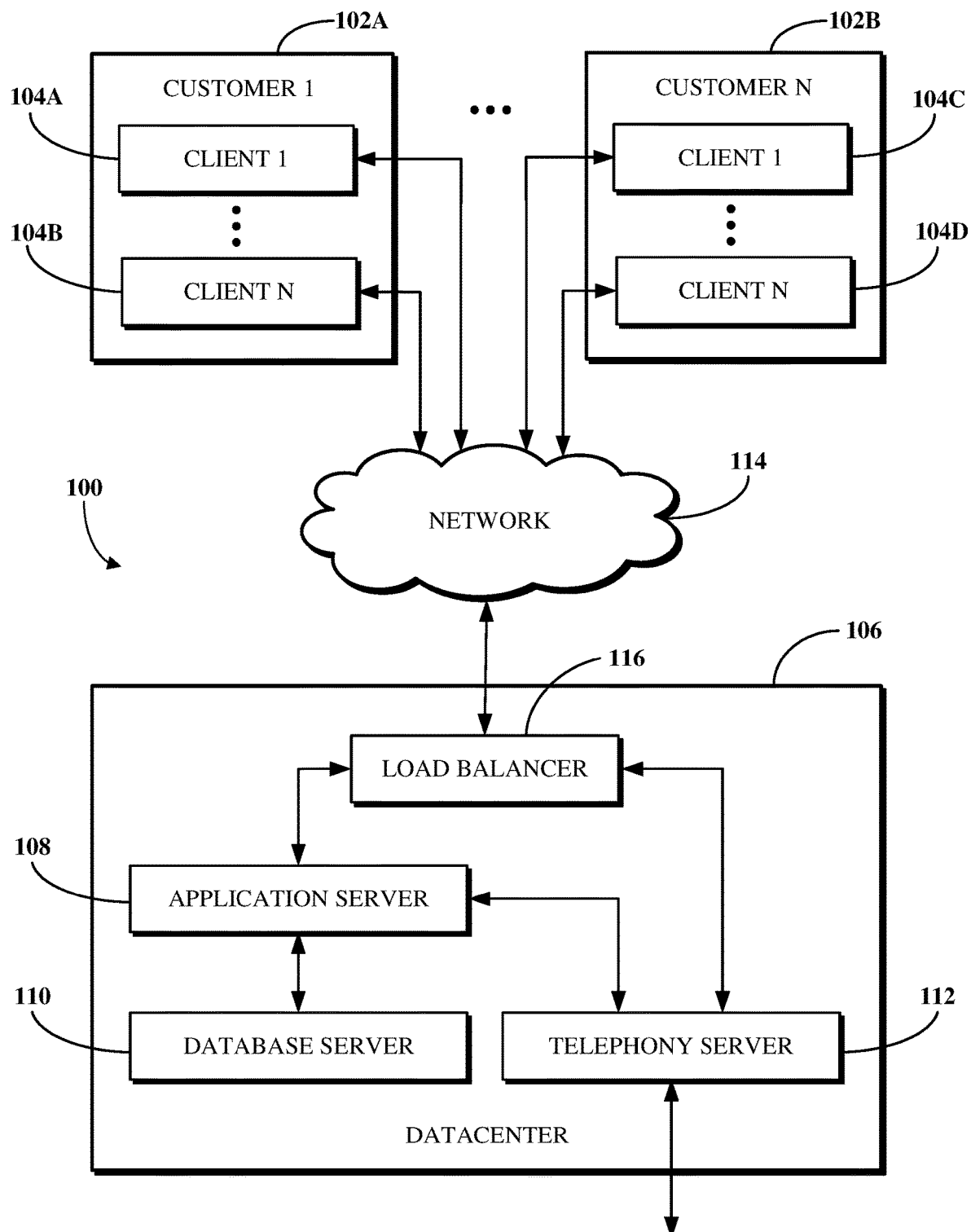
FIG. 1 is a block diagram of an example of an electronic computing and communications system.

Conventional UCaaS platforms implement a range of communication and collaboration tools, including, for example, telephony services and conferencing services. UCaaS platforms are typically implemented using multi-tenant architecture in which infrastructure and software instantiations are shared between platform users. While the typical UCaaS platform architecture allows users to access the same services, it does not enable customization on the basis of specific users. For example, call-in numbers for multi-tenant conferencing services are typically shared across all users of a conventional UCaaS platform because a conventional UCaaS platform does not allow individual users to customize such call-in numbers. Furthermore, given this inflexibility on the part of conventional UCaaS platforms to allow customizations for individual users, there is no mechanism by which to route calls to certain phone numbers or extensions, for example, local or toll free phone numbers or extensions, to software services of such a UCaaS platform.

Implementations of this disclosure address problems such as these by integrating voice and video features of a software platform, which may, for example, be a UCaaS platform. Routing rules are defined to route calls to certain phone numbers or extensions to certain software services. Thereafter, when a call is received via a telephony system associated with the software platform, a routing rule customized for the software platform is identified based on information signaled with the call, such as a phone number or extension dialed to place the call. A software service is determined based on the routing rule, and the phone is connected with the software system that provides the software service. As such, the routing rules disclosed herein may be generated and used on a customer-basis to customize aspects of a multi-tenant software platform for individual customers thereof.

The implementations of this disclosure thus allow for numerous customization approaches for integrating telephony services of a software platform with software services of that software platform. In one example, a routing rule may be defined to route calls to a phone number assigned to a customer of the software platform, such as a local or toll free number anywhere within a service area of the software platform, to an interactive voice response (IVR) system. The IVR system may be customized for the customer using certain prompts. A response to a prompt can be routed to either a specific virtual meeting. In some cases, the caller may be prompted to enter a meeting identifier associated with that virtual meeting, such as before being connected thereto. In some cases, the IVR system may be facilitated using an auto attendant of the software platform.

In another example, a routing rule may be defined to route calls to a phone extension, such as a local extension for phones registered to the software platform for a customer thereof, to a specific virtual meeting. The phone number or extension may be a simple number called from a phone dialer or hotkey which seamlessly connects the caller to the virtual meeting. In some cases, the caller may be prompted to enter a meeting identifier associated with that virtual meeting, such as before being connected thereto. In this way, a customer of the software platform can configure virtual meetings to allow callers to participate therein using a phone number local to an office of the customer or using a main phone number for the customer.

In yet another example, a universal meeting identifier may be created for a universal meeting, which may be a virtual meeting that is generally accessible to an entire corps of the customer or a subset thereof. The universal meeting may, for example, be an emergency bridge line. A routing rule may be defined to route calls to a phone number or extension to the universal meeting in which the callers are automatically authenticated based on the universal meeting identifier being associated with that phone number or extension.

In still a further example, a universal identifier may be created for a software service other than a virtual meeting which is generally accessible to the entire customer corps or a subset thereof. For example, a routing rule may be defined to route calls to a phone number or extension to an emergency service (e.g., an E911 service) based on the universal identifier being associated with that phone number or extension. In another example, a routing rule may be defined to route calls to a phone number or extension to another software service of the software platform based on the universal identifier being associated with that phone number or extension.

To describe some implementations in greater detail, reference is first made to examples of hardware and software structures used to implement inbound call routing in an integrated voice and video platform. FIG. 1 is a block diagram of an example of an electronic computing and communications system 100, which can be or include a distributed computing system (e.g., a client-server computing system), a cloud computing system, a clustered computing system, or the like. The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other data stores suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database or other data store for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
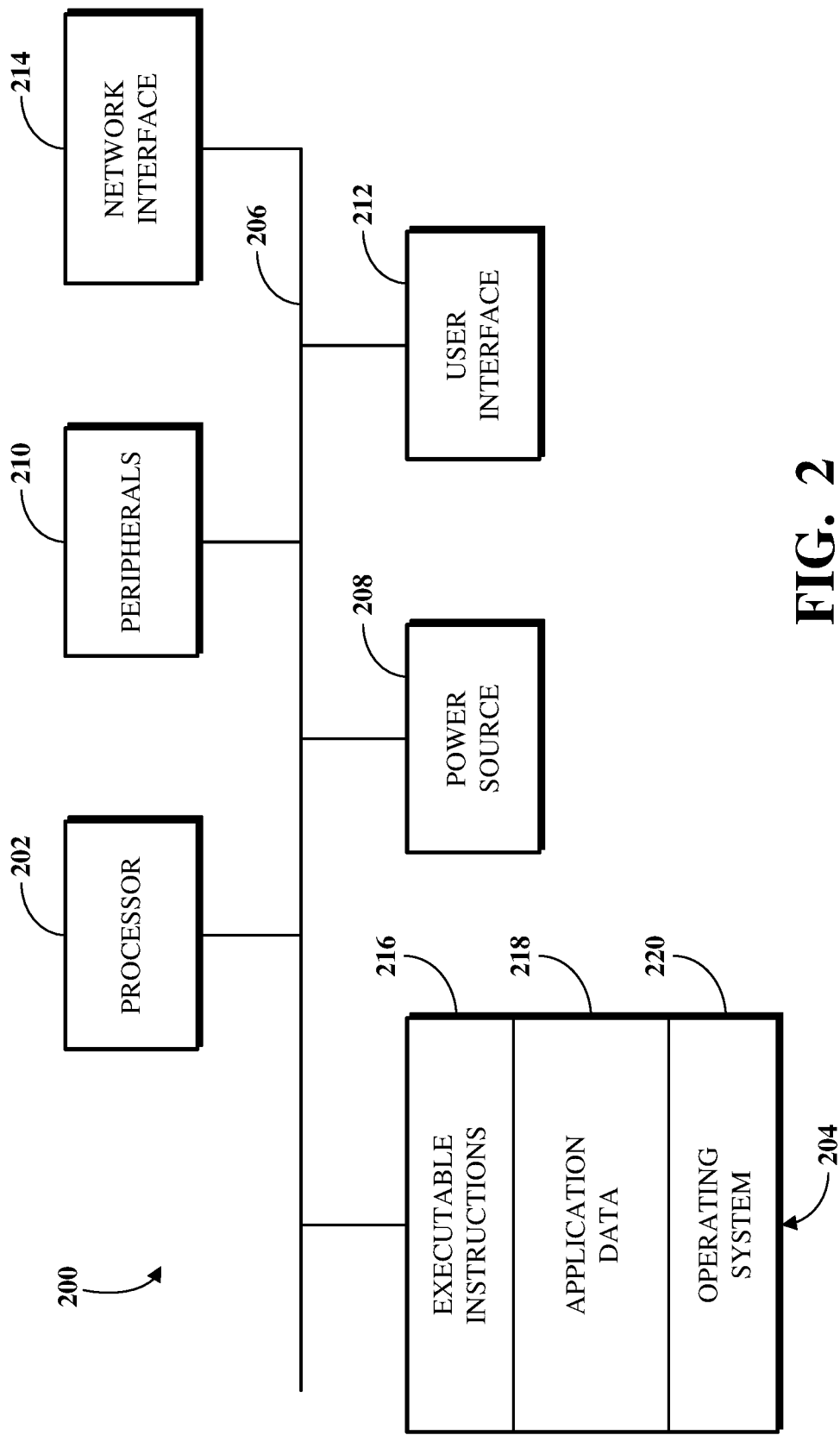
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
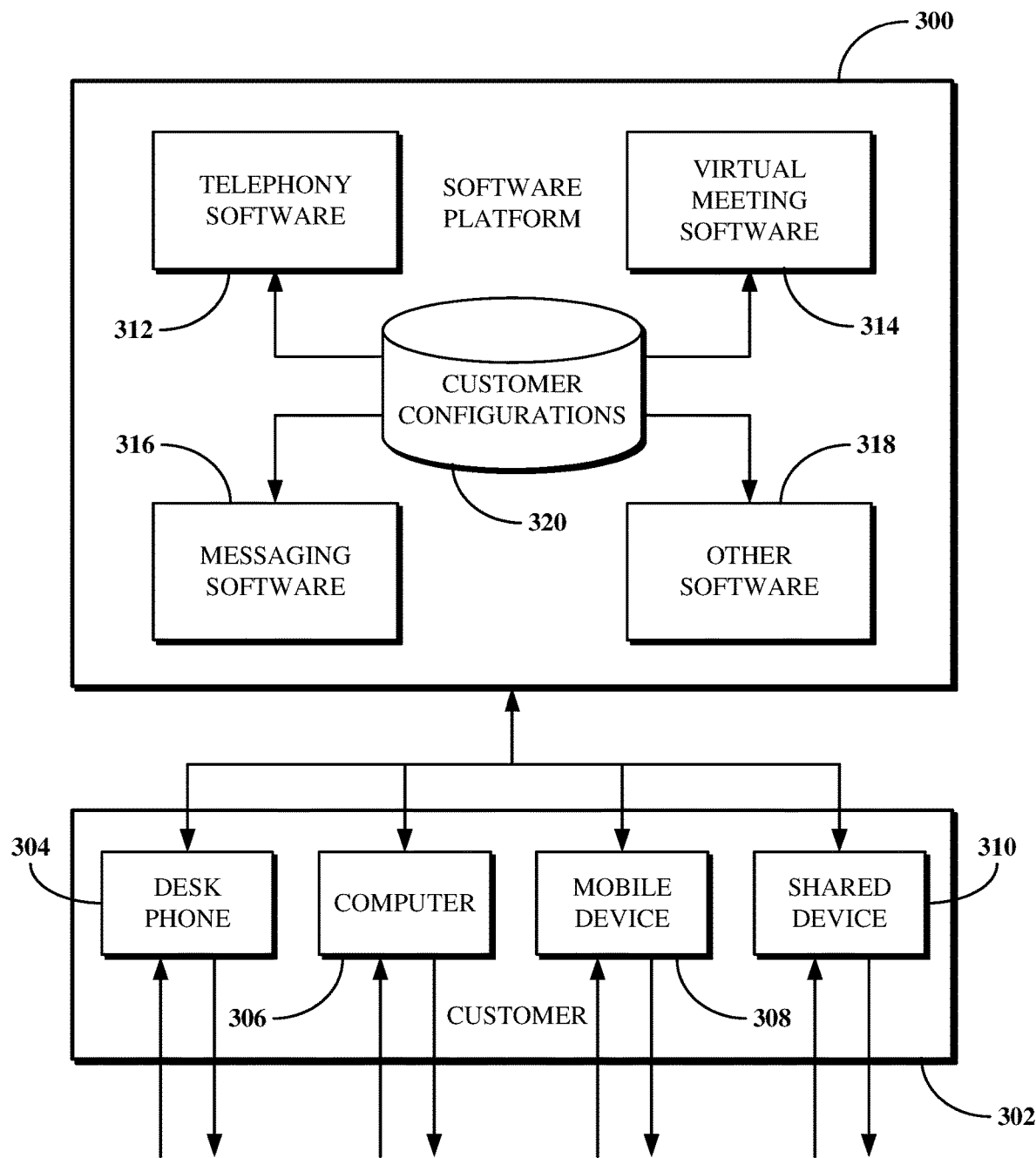
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtual meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the virtual meeting software 314, the messaging software 316, or the other software 318.

The virtual meeting software 314 enables audio, video, and/or other forms of virtual meetings between multiple devices, such as to facilitate a conference between the users of those devices. The virtual meeting software 314 can include functionality for hosting, presenting scheduling, joining, or otherwise participating in a virtual meeting. The virtual meeting software 314 may further include functionality for recording some or all of a virtual meeting and/or documenting a transcript for the virtual meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a routing engine for routing calls from phones received over a telephony system to software services of the software platform 300.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtual meeting. In yet another example, the virtual meeting software 314 may include functionality for sending and receiving instant messages between participants and/or other users of the customer 302. In yet another example, the virtual meeting software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
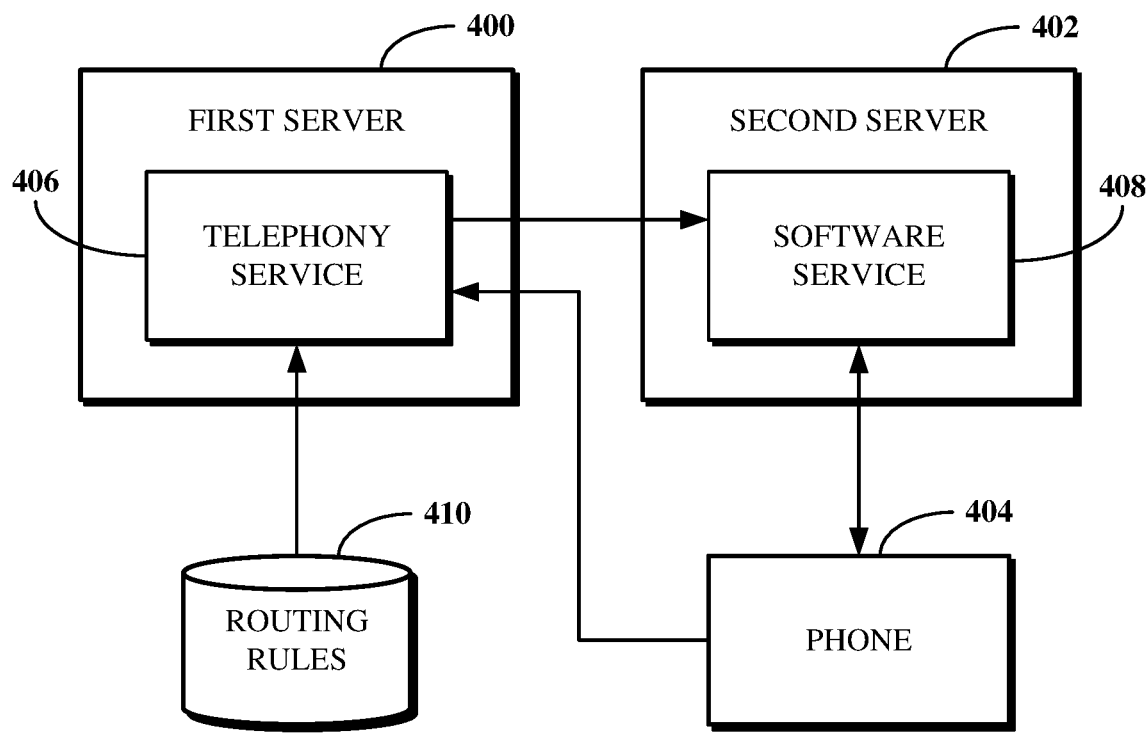
FIG. 4 is a block diagram of an example of servers used to integrate voice and video features of a software platform.

FIG. 4 is a block diagram of an example of servers used to integrate voice and video features of a software platform, which may, for example, be the software platform 300 shown in FIG. 3. As shown, a first server 400 and a second server 402 communicate based on a call received from a phone 404. The first server 400 includes a telephony service 406. The second server includes a software service 408. The call from the phone 404 is processed by the telephony service 406 to route the call to the software service 408.

The phone 404 may be a phone associated with a customer of the software platform (e.g., the desk phone 304 or the mobile device 308 of the customer 302 shown in FIG. 3) or a phone which is not associated with a customer of the software platform. For example, the phone 404 may or may not have a client application associated with the software service 408 or the software platform installed or otherwise running thereon. Routing the call to the software service 408 enables an operator of the phone 404 to connect to software of the software platform, which may, for example, be one of the software 312 through 318 shown in FIG. 3. Although the first server 400 and the second server 402 are shown as separate servers, in some implementations, a single server may include both the telephony service 406 and the software service 408.

The telephony service 406 includes one or more telephony aspects which receive and process a call from the phone 404. For example, the telephony service 406 may be implemented using the telephony server 112 shown in FIG. 1. The telephony service 406 may include one or more of a PBX, a SBC, and/or other telephony aspects. The telephony service 406 accesses a data store 410 storing routing rules to determine how to route the call from the phone 404. The data store 410 may be a database or other data store associated with the software platform. For example, the data store 410 may be implemented using the database server 110 shown in FIG. 1.

In particular, the routing rules stored in the data store 410 are generated to identify a software service of the software platform (e.g., the software service 408 or another software service) to which to route a call to a certain phone number or extension. For example, a first routing rule may indicate that a phone call to a first phone number or extension should be routed to a particular virtual meeting for a certain operator at a customer of the software platform, so as to connect the caller with that virtual meeting and to enable the caller to participate in the virtual meeting. In another example, a second routing rule may indicate that a phone call to a second phone number or extension should be routed to a software service associated with a universal identifier defined for the customer, so as to enable the caller to use the software service.

The routing rules may be generated at a device registered with the software platform. For example, the device may be one of the clients 304 through 310 shown in FIG. 3. Generating a routing rule may include customizing a routing pathway for a call from the telephony service 406 to the software service 408. In some implementations, the routing rule may be associated with an identifier for the software service 408. For example, the identifier may be a meeting identifier used to identify a specific virtual meeting to which to connect a caller where the software service 408 is or includes virtual meeting software. In another example, the identifier may be a universal identifier used to access or authenticate the caller to access the software service.

Although the software service 408 is a multi-tenant software aspect delivered to multiple users and customers of the software platform, the phone numbers and extensions identified within a routing rule and thus used to generate a routing rule a customized for a specific customer. In this way, callers who wish to reach a customer may connect to a particular instance of the software service (e.g., a particular virtual meeting) by dialing a phone number or extension which is specific to that customer.

Figure 5:
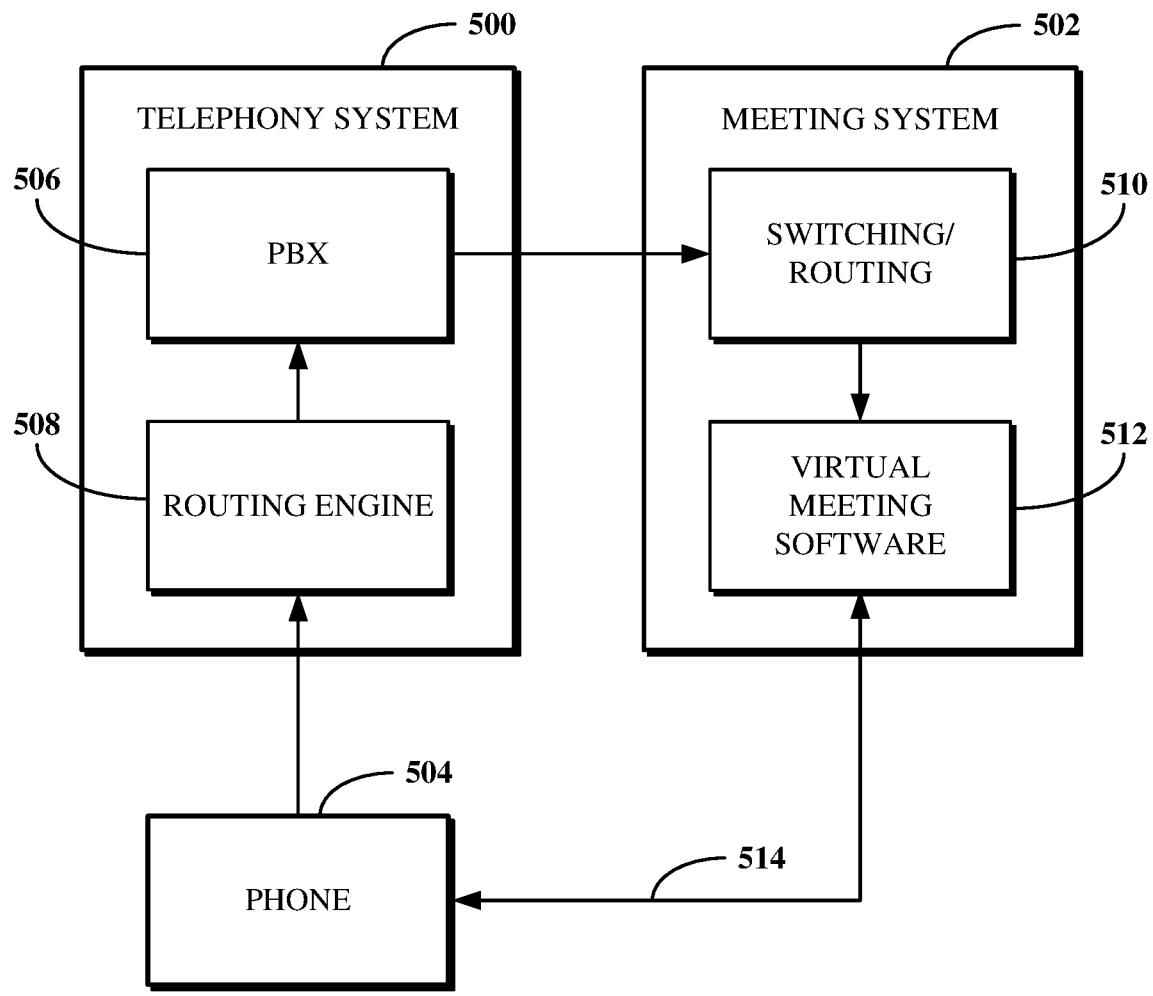
FIG. 5 is a block diagram of an example of a telephony system and a meeting system of a software platform.

FIG. 5 is a block diagram of an example of a telephony system 500 and a meeting system 502 of a software platform, which may, for example, be the software platform 300 shown in FIG. 3. The telephony system 500 routes a call received from a phone 504, which may, for example, be the phone 404 shown in FIG. 4, to a software service implemented using the meeting system 502. The telephony system 500 and the meeting system 502 may be implemented on the same or different servers. In some implementations, the telephony system 500 may be implemented on a first server, for example, the first server 400 shown in FIG. 4, and the meeting system 502 may be implemented on a second server, for example, the second server 402 shown in FIG. 4. For example, the telephony system 500 may be or include the telephony service 406 shown in FIG. 4 and the meeting system 502 may be or include the software service 408 shown in FIG. 4.

The telephony system 506 includes a PBX 506 and a routing engine 508. The PBX 506 is a PBX of the software platform and is configured to handle and process telephony traffic for one or more customers of the software platform. The routing engine 508 is software which processes calls received at the telephony system 500 using routing rules customized for a customer of the software platform to determine software services to which to route those calls. For example, the routing engine 508 may access a data store that stores the routing rules to identify a routing rule for a call received from the phone 504. The data store may, for example, be the data store 410 shown in FIG. 4. A routing rule identified based on a call configures the PBX to route the call to the meeting system 502.

The meeting system 502 includes a switching/routing tool 510 and virtual meeting software 512. The virtual meeting software 512, which may, for example, be the virtual meeting software 314 shown in FIG. 3, implements virtual meetings as instances of the virtual meeting software 512. A virtual meeting includes transmitting and receiving video, audio, and/or other data between clients and/or phones of virtual meeting participants. Each client and phone may connect to the virtual meeting software 512 through the meeting system 502 using separate input streams to enable operators thereof to participate in a virtual meeting together using the virtual meeting software 512.

The virtual meeting software 512 includes a dedicated meeting view for each input stream received and processed at the meeting system 502. For example, a meeting view may be represented within a graphical user interface (GUI) of the virtual meeting software 512 by a dedicated box for a given participant. The content of the meeting view for a given participant may be dependent upon the source of the input stream for that participant. For example, where a participant accesses the virtual meeting software 512 from a client, the meeting view for the participant may include a video output stream transmitted from the meeting system for viewing by all participants based on a video input stream received from the client, although the participant may optionally disable video features to suspend the video output stream from being presented in the meeting view. In another example, where a participant access the virtual meeting software 512 from a phone, such as the phone 504, the meeting view for the participant may be limited to a static image or other default background aspect since there is no video output stream produced for that participant.

The switching/routing tool 510 directs bitstreams through applicable network infrastructure and/or other hardware to deliver the bitstreams to the virtual meeting software 512. The virtual meeting software 512 delivers output bitstreams representative of the respective encoded streams to each connected client and/or phone. In some implementations, the switching/routing tool 510 may be included in the virtual meeting software 512.

To participate in a virtual meeting at the virtual meeting software 512, an operator of the phone 504 calls a phone number or extension which is associated with a customer of the software platform. The routing engine 508 receives the call and processes information signaled with the call, such as the phone number or extension dialed by the operator of the phone 504, to identify a routing rule defined for the customer. For example, the routing engine 508 may search a data store that stores the routing rules for a routing rule associated with the phone number or extension. Upon identifying a routing rule, the routing engine 508 passes the call to the PBX 506 to deliver the call to the intended destination indicated by the routing rule, which in this case is the virtual meeting software 512. For example, the PBX 506 may transmit the call to the switching/routing tool 510 for delivery to the virtual meeting software 512. In another example, the PBX 506 may transmit the call directly to the virtual meeting software 512. A channel 514 is then opened between the phone 504 and the virtual meeting software 512 to allow the operator of the phone 504 to participate in a virtual meeting associated with the dialed phone number or extension at the virtual meeting software 512.

In some implementations, telephony system 500 may include a VOIP gateway to prepare a digital telephony signal for processing at the meeting system 502 based on the call received from the phone 504.

In some implementations, other software services may be accessible in connection with a virtual meeting implemented using the meeting system 502. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the meeting system 502 and/or a different aspect of the software platform.

In some implementations, a communication over another software service, such as an instant messaging, email, or chat service, may lead to a routing of a call from the phone 504 to the virtual meeting software 512. For example, an instant message, email, or chat communication between two or more participants may be escalated to a virtual meeting. A call-in number to use for the virtual meeting may be provided over the communication. Participants of the communication may then call into the virtual meeting from their phones by dialing the call-in number, which may be a phone number or extension, that routes the calls through the telephony system 500 to the meeting system 502 according to a routing rule associated with the call-in number to allow the participants of the communication to participate in a virtual meeting.

Figure 6:
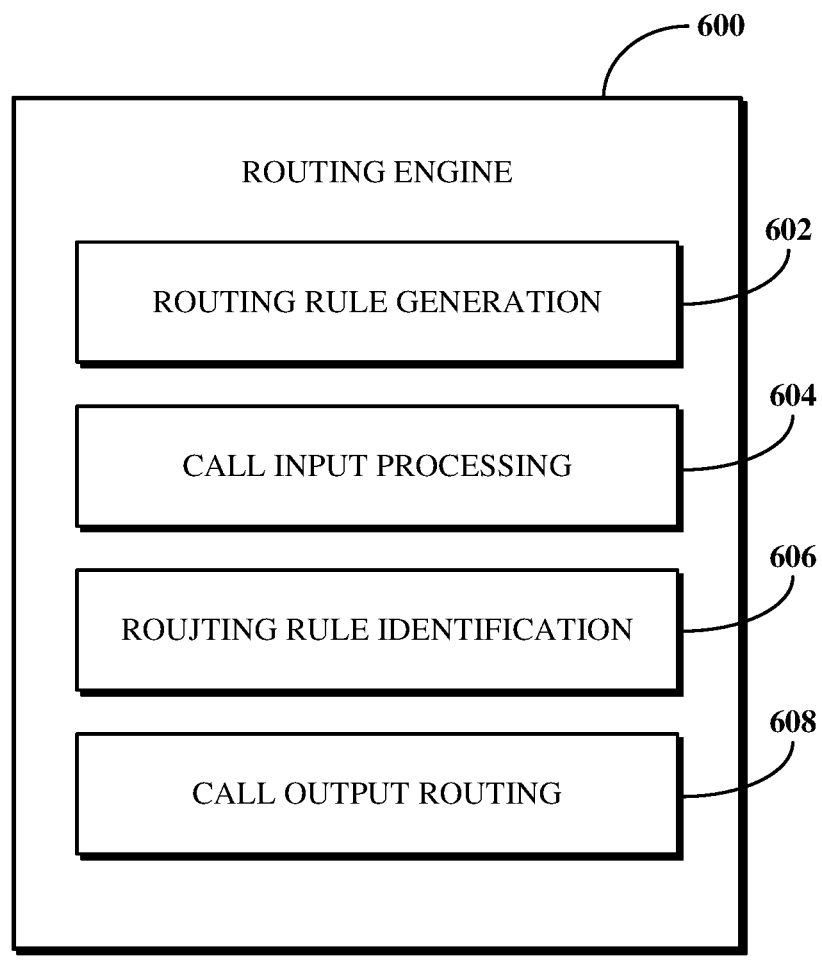
FIG. 6 is a block diagram of example functionality of a routing engine used by a telephony system of a software platform.

FIG. 6 is a block diagram of example functionality of a routing engine 600 used by a telephony system of a software platform. For example, the routing engine 600 may be the routing engine 508 shown in FIG. 5 and the software platform may be the software platform 300 shown in FIG. 3. The routing engine 600 includes software tools for routing calls from phones received over a telephony system to software services of the software platform. As shown, the routing engine 600 includes a routing rule generation tool 602, a call input processing tool 604, a routing rule identification tool 606, and a call output routing tool 608. Although the tools 602 through 608 are shown as functionality of the routing engine 600 as a single piece of software, in some implementations, some or all of the tools 602 through 608 may exist outside of the routing engine 600.

The routing rule definition tool 602 is used to generate routing rules for routing calls to phone numbers or extensions to software services of a software platform. An operator of a device registered with the software platform for a customer of the software platform provides input used to generate a routing rule. The input identifies the phone number or extension that when called is routed to a particular destination within the software platform. The input further identifies that particular destination as a software service of the software platform. For example, the destination to which to route a call may be an instance of virtual meeting software, for example, the virtual meeting software 512 shown in FIG. 5.

The call input processing tool 604 processes input to the routing engine 600, which is a call received from a phone, for example, the phone 504 shown in FIG. 5. The call input processing tool 604 in particular processes the call to identify information signaled with the call which is usable to identify a routing rule. For example, the information signaled with the call may be one or more of a phone number or extension dialed by the operator of the phone, a response to an IVR system, a meeting identifier for a virtual meeting, a universal identifier for a software service which may be a virtual meeting service or another software service, or the like.

The routing rule identification tool 606 searches a data store that stores routing rules based on the information signaled with the call to identify a routing rule to use to route the call to a particular destination of the software service. For example, the routing rule identification tool 606 may search the data store based on a phone number or extension signaled by the call. A routing rule is identified where that routing rule identifies the phone number or extension.

The call output routing tool 608 outputs the call for routing through the software platform. In particular, the call output routing tool 608 signals the destination for the call as determined based on the identified routing rule. In some implementations, the output of the call output routing tool 608, and thus the output of the routing engine 600, may be transmitted to a PBX which will deliver the telephony traffic of the call to the destination software service. In some implementations, the output of the call output routing tool 608 may be transmitted directly to a system which provides the destination software service.

Figure 7:
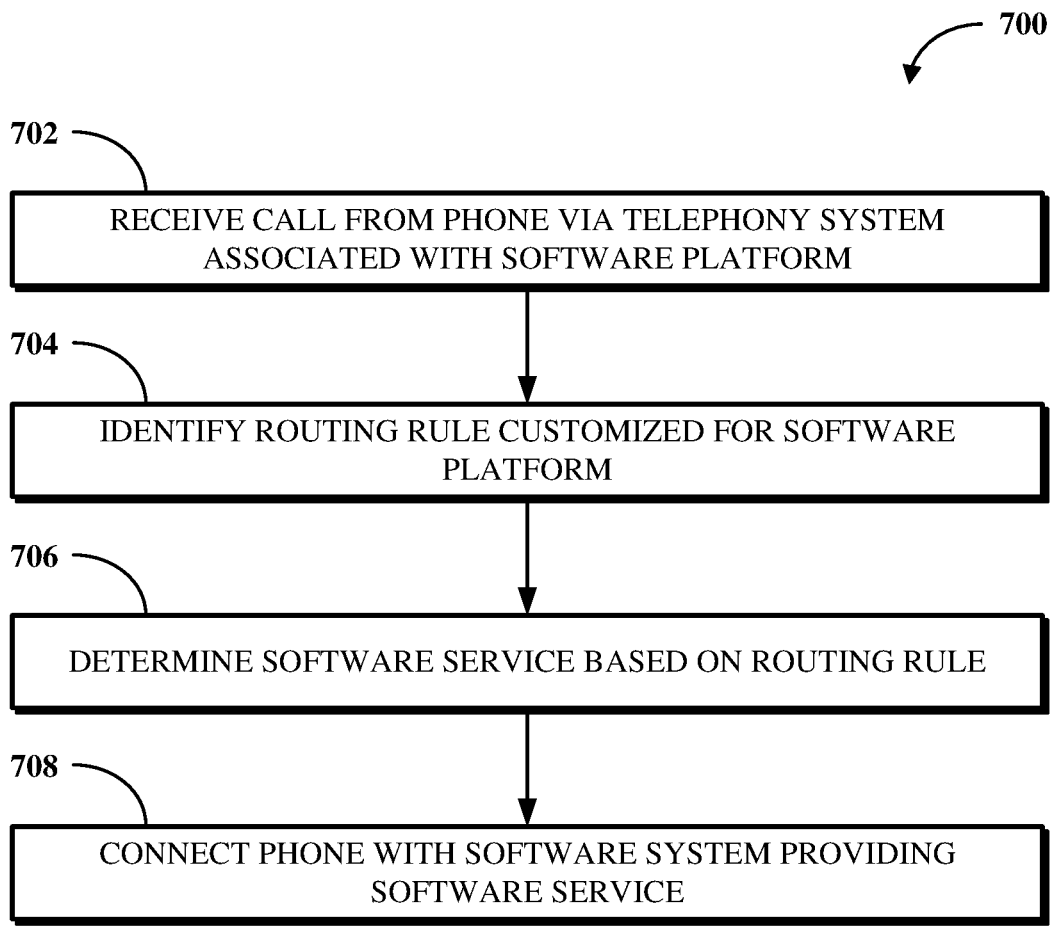
FIG. 7 is a flowchart of an example of a technique for routing a call to a software service in an integrated voice and video platform.

To further describe some implementations in greater detail, reference is next made to examples of techniques which may be performed by or using an integrated voice and video platform. FIG. 7 is a flowchart of an example of a technique 700 for routing a call to a software service in an integrated voice and video platform, such as a UCaaS platform. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a call is received from a phone via a telephony system associated with a software platform. The phone may be a phone pre-registered with the software platform. For example, the phone may be the desk phone 304 or the mobile device 308 of the customer 302 shown in FIG. 3. Alternatively, the phone may be a phone which is not pre-registered with the software platform. For example, the phone may be a phone operated by someone who is not part of the customer of the software platform. The call is to a phone number or extension associated with the customer of the of the software platform.

At 704, a routing rule customized for the software platform is identified based on information signaled with the call. The routing rule is generated for customer of the software platform. In particular, the phone number or extension called by the phone as the call received via the telephony system is customized for the customer of the software platform. Thus, the routing rule is customized in that it is based on a customized phone number or extension for the customer.

The information signaled with the call includes the phone number or extension dialed by the caller. For example, that phone number or extension may be signaled in a bitstream of the call or otherwise signaled based on the receipt of the call to that phone number or extension. Alternatively, or additionally, the information signaled with the call may include a response to an IVR system.

The routing rule is generated based on input received from a device registered with the software platform for the customer. For example, the input may specify a software service and a phone number or extension to route to the software service. The routing rule may be stored in a data store associated with the software platform. For example, a routing engine of the software platform may access the data store to identify a corresponding routing rule upon receiving or otherwise detecting a call to a phone number or extension. There may be multiple routing rules customized for a customer of the software platform. Each of the routing rules may be configured to route calls to different phone numbers or extensions to different software services of the software platform or to different instances thereof (e.g., different virtual meetings of virtual meeting software).

At 706, a software service of the software platform is determined based on the routing rule. The software service is associated with the routing rule. For example, the routing rule may indicate the software service or instance thereof to which to route a call to a corresponding phone number or extension. The software service can thus be determined by identifying the routing rule, such as within a data store.

The phone number or extension may in some cases be associated with a universal identifier. For example, when generating the routing rule, the routing rule can be defined to route calls to a certain phone number or extension to a software service using a universal identifier for the software service. The universal identifier is used to authenticate the caller to access the software service. Determining the software service may thus in some cases include identifying a universal identifier associated with the routing rule. In some implementations, determining the software service may further include authenticating the caller to the software service using the universal identifier.

At 708, the phone is connected with a software system that provides the software service. The software system may include hardware and/or software used to implement the software service. For example, the software system may refer to one or both of software or a server device which runs the software. For example, where the software service is a virtual meeting, the software system may include one or both of virtual meeting software of the software platform or a server device which runs the virtual meeting software. Connecting the phone with the software system includes routing the call to the software system and opening a channel between the phone and the software system.

Where the caller from the phone is the first participant to connect with the software service, connecting the phone with the software system can include launching the software service. For example, where the software service is or includes virtual meeting software and the caller is the first to join the virtual meeting thereat, connecting the phone with the software system can include launching an instance of the virtual meeting software to start the virtual meeting.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    configuring a routing rule for use with a virtual meeting implemented using a virtual meeting service of a software platform; and
    connecting, via a telephony service of the software platform and based on the routing rule, a call to a telephone number associated with the routing rule to the virtual meeting.

2. The method of claim 1, wherein connecting the call to the virtual meeting comprises:
    routing, according to the routing rule, the call to an interactive voice response system;
    prompting, based on a selection within the interactive voice response system, a user of a phone from which the call is received to enter a meeting identifier associated with the virtual meeting; and
    connecting the call to the virtual meeting based on a receipt of the meeting identifier.

3. The method of claim 1, wherein the telephone number is a local extension configured for phones registered to the software platform.

4. The method of claim 1, wherein a universal meeting identifier is associated with the telephone number, the method comprising:
    authenticating a user of a phone from which the call is received for the virtual meeting based on the use of the routing rule.

5. The method of claim 1, wherein the routing rule is one of multiple routing rules configured for use with multiple software services of the software platform.

6. The method of claim 1, wherein the routing rule is identified based on information signaled with the call.

7. The method of claim 1, wherein the virtual meeting service is identified for use in routing the call based on the routing rule.

8. The method of claim 1, wherein the software platform is a unified communications as a service software platform.

9. A non-transitory computer readable medium storing instructions that, when executed by a processor, cause a performance of operations comprising:
    configuring a routing rule for use with a virtual meeting implemented using a virtual meeting service of a software platform; and
    connecting, via a telephony service of the software platform and based on the routing rule, a call to a telephone number associated with the routing rule to the virtual meeting.

10. The non-transitory computer readable medium of claim 9, wherein connecting the call to the telephone number to the virtual meeting comprises:
    routing the call to the virtual meeting based on a response to an interactive voice response system.

11. The non-transitory computer readable medium of claim 9, wherein the routing rule indicates to connect a telephone extension accessed as the telephone number to the virtual meeting service.

12. The non-transitory computer readable medium of claim 9, wherein the routing rule is associated with a universal meeting identifier for the virtual meeting.

13. The non-transitory computer readable medium of claim 9, wherein the routing rule is one of multiple routing rules customized for a customer of the software platform.

14. An apparatus, comprising:
    a memory; and
    a processor configured to execute instructions stored in the memory to:
        configure a routing rule for use with a virtual meeting implemented using a virtual meeting service of a software platform; and
        connect, via a telephony service of the software platform and based on the routing rule, a call to a telephone number associated with the routing rule to the virtual meeting.

15. The apparatus of claim 14, wherein, to connect the call to the virtual meeting, the processor is configured to execute the instructions to:
    cause a client application running at a phone from which the call is received to connect to the virtual meeting.

16. The apparatus of claim 14, wherein, to connect the call to the virtual meeting, the processor is configured to execute the instructions to:
    identify the routing rule based on information signaled within the call.

17. The apparatus of claim 14, wherein the processor is configured to execute the instructions to:
    store a record associated with the routing rule in a data store based on the configuration of the routing rule, wherein the record is accessed to connect the call to the virtual meeting.

18. The apparatus of claim 14, wherein a user of a phone from which the call is received is authenticated for the virtual meeting based on the use of the routing rule.

19. The apparatus of claim 14, wherein the routing rule connects a prompt of an interactive voice response system accessed using the telephone number to the virtual meeting service.

20. The apparatus of claim 14, wherein the routing rule is specific to a customer of the software platform.

\* \* \* \* \*